Patented Oct. 26, 1926.

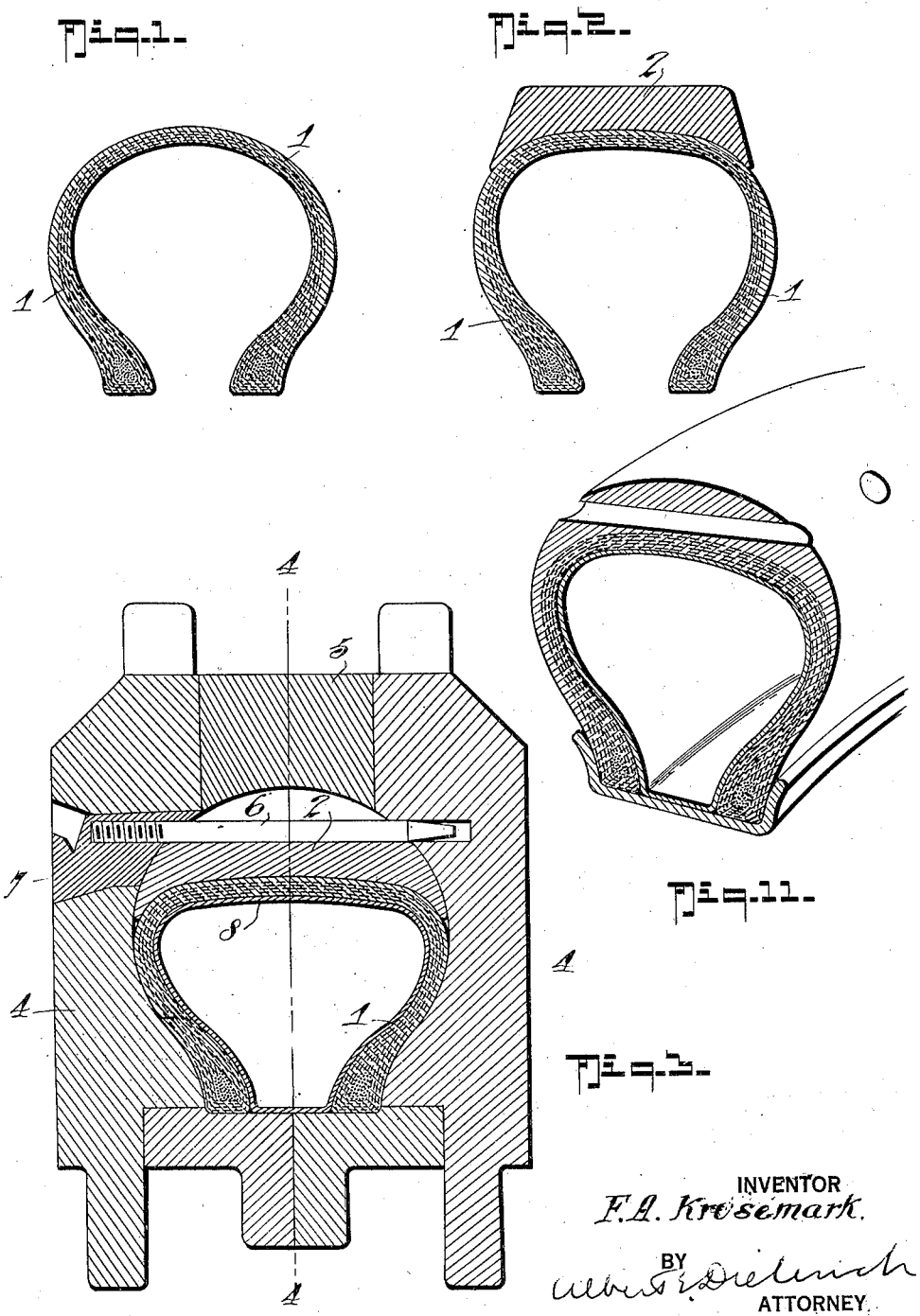

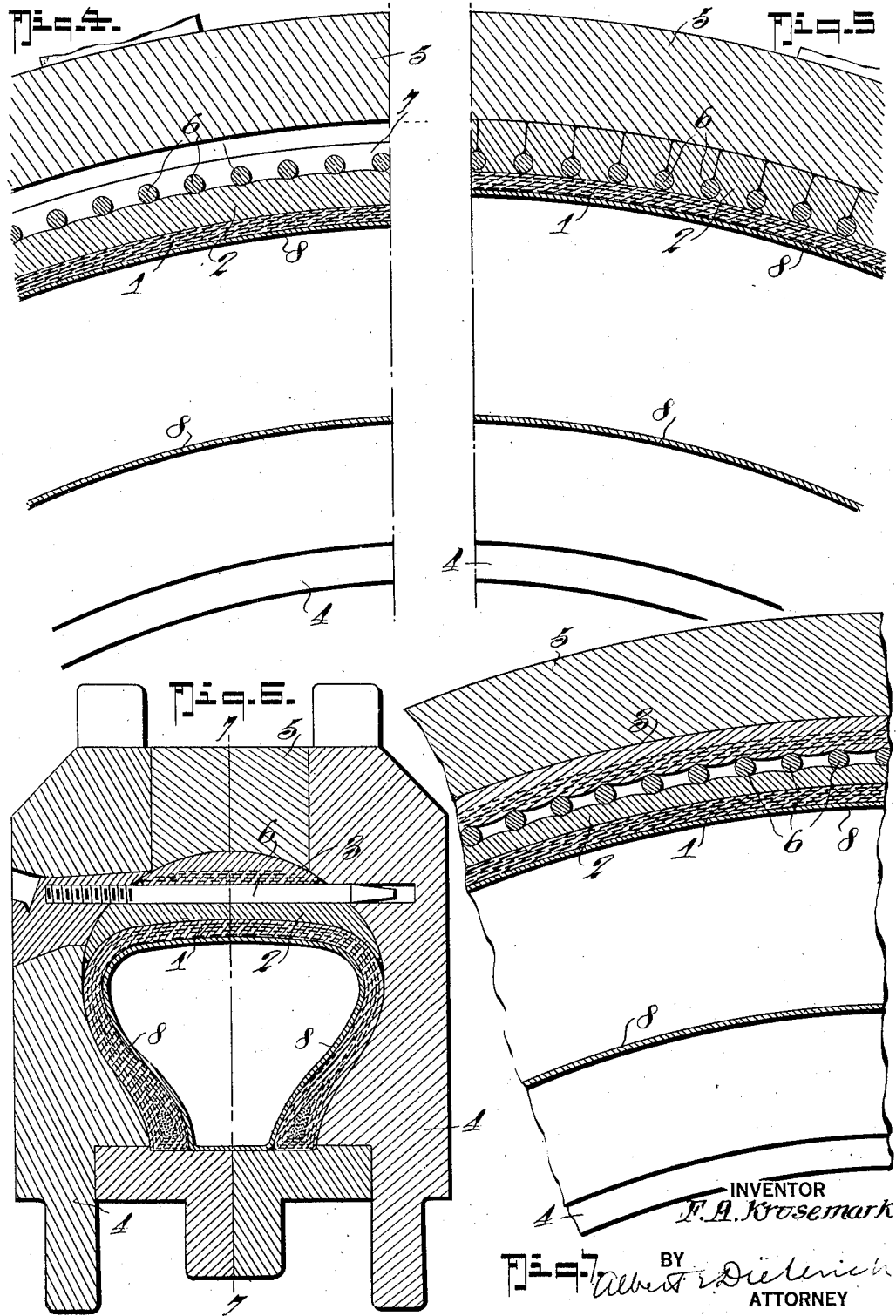

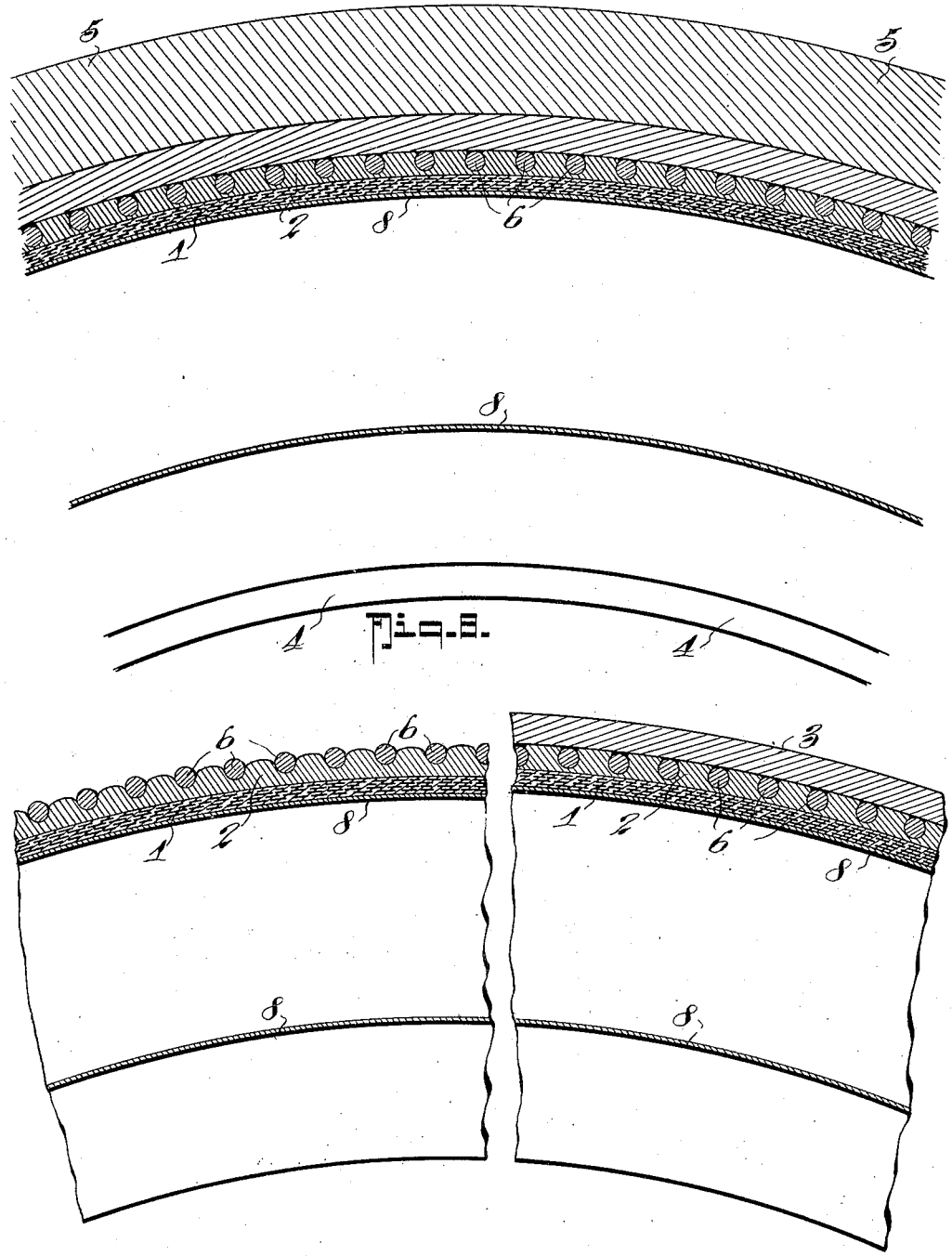

1,604,451

UNITED STATES PATENT OFFICE.

FREDERICK AUGUSTUS KRUSEMARK, OF AKRON, OHIO, ASSIGNOR TO LAMBERT TIRE & RUBBER CO., OF BARBERTON, OHIO, A CORPORATION OF ARIZONA.

PROCESS OF MANUFACTURING PNEUMATIC TIRES.

Application filed January 12, 1926. Serial No. 80,784.

My invention has relation to the art of pneumatic tire manufacture and it has for its object to provide a simple and effective easily carried out process by which tires having ventilated puncture resisting treads of the type disclosed in my application filed December 22, 1925, Serial No. 77,048, may be made.

Generically the invention resides in the method of manufacturing such tires by which the tire carcass proper may be built up in the usual way and thereafter surrounded by tread rubber (or green rubber) which is thereafter pressed around recess-forming or core pins (held in position around the periphery) by internal expansion.

More specifically the invention resides in the novel steps and method of manipulation of the materials dealt with in order to produce, in an inexpensive way, a tire of the kind referred to which will have a tough tread to resist punctures and yet be sufficiently pliable and resilient to prevent disintegration.

In the drawings:

Figure 1 is a diagrammatic cross section illustrating the first step in my process of manufacturing pneumatic tires of the type mentioned.

Figure 2 is a view similar to Figure 1 showing the tire carcass surrounded with a band of green or tread forming rubber before placing the recess or hole-forming pins in place.

Figure 3 is a view showing the mass of Figure 2 with the recess or hole-forming pins in position and the mold plates in position.

Figure 4 is a detail longitudinal section on the line 4—4 of Figure 3.

Figure 5 is a view similar to Figure 4 with the internal air pressure applied by means of an air bag which has been inflated to force the green rubber in between the pins.

Figure 6 is a view similar to Figure 3 showing a slight modification of the process where a breaker strip is to be used in the tread.

Figure 7 is a detail section on the line 7—7 of Figure 6.

Figure 8 is a view similar to Figure 7 showing the air bag inflated and the rubber forced from the lower portion of the tread band between the pins to unite with the outer portion of the tread band rubber.

Figure 9 is a view similar to Figure 5 showing how the internal pressure may partly be applied to force the green rubber between the pins.

Figure 10 is a view similar to Figure 9 with additional tread rubber placed around the pins after the air bag has been partially inflated.

Figure 11 is a sectional perspective view of a completed tire.

In the drawings in which like numerals of reference indicate like parts in all the figures, 1 designates the tire carcass proper which may be built up according to the usual and accepted methods (the tire carcass proper comprising the rubberized fabric or cord formed into the proper shape as is usual).

2 indicates the green or tread forming rubber which is usually applied in the form of a band composed of several layers or thicknesses of thin sheet rubber, or it may be applied as a single thickness of rubber if preferred. The tread rubber 2, in carrying out my invention, may be applied as a single mass before placing the recess or hole-forming pins in position, or it may be applied in two sections, one half being placed before the pins are positioned and the other half placed after the pins have been positioned, the latter way being the preferable one where a breaker strip 3 is to be employed.

Any approved type of mold may be used in carrying out my method, for instance the mold shown in my application Serial No. 752,407, filed November 26, 1924, or that of my application filed December 22, 1925, Serial No. 77,048.

The mold consists of two essential parts, namely, the side plates 4—4 which may include the thread forming portion or separate tread plate sections 5 may be used, and the recess forming or core pins 6 which are usually carried on rings 7 that will enable the pins to be placed before the side mold plates are put in position, if desired.

8 designates an air bag which may be inflated to apply the necessary internal expanding pressures for forcing the rubber between the pins.

Where the tire is to have a breaker strip in the tread I prefer that the carcass proper be assembled with an annular tread quantity of rubber sufficient to fill the spaces between the pins and place the remainder of the tread forming rubber with the breaker strip around the pins. In doing this I may proceed as follows: First, I will take the carcass (Fig. 1) and wind around it the necessary quantity of tread rubber (Fig. 6), at the same time sufficiently constricting the perimeter of the tire so that the recess forming pins may be placed in position around the same. Then I wind the remaining portion of the tread rubber around the pins, placing the breaker strip at the proper position and insert the mass within the vulcanizing mold. After which pressure is applied (Fig. 8) via the air bag to force the green rubber of the first tread section up and outwardly between the pins to unite with that containing the breaker strip so that when the necessary heat is applied the two will run together into an integral mass.

Or, I may proceed in this way, namely surround the carcass with a quantity of tread forming rubber, place the pins in position and inflate the air bag enough to force the tread rubber up between the pins (see Fig. 9) and then place the remaining tread rubber around the pins and in contact with the rubber that has been forced up between the pins (Fig. 10). Thereafter enclose the mass in a vulcanizing mold and apply additional pressure within the air bag to complete the squeezing operation and cause the masses of tread rubber to unite into an integral mass.

When a breaker strip is employed it will, of course, be understood that the same will be substantially in-elastic and may be composed of fabric or cord as found most desirable.

After vulcanization under pressure the mass is removed from the mold, the core pins withdrawn and the air bag taken out, whereupon the tire will be ready for service.

There are numerous modifications of my process that can be carried out, for instance the outer layer of tread rubber may be built up around the pins separately before the pins are applied to the carcass with its band of tread rubber, or the carcass can be placed in a mold having a removable tread ring and the tread rubber wound around the carcass while in the mold, after which the core pins would be placed and the remaining tread rubber wound around the core pins (unless the first mass of tread rubber is sufficient to squeeze through between the pins and fill the mold upon inflation of the air bag). Many other modifications of my process may be adopted, but the essential feature of the process consists in the two steps of first building the carcass proper according to any accepted practice, then applying tread rubber in the form of a band or bands around the periphery of the carcass and causing it to flow and displace itself between adjacent core pins by pressure radially from within the carcass, thereby producing a tread structure having recesses or holes in the same regardless of whether those holes go entirely through from side to side or are merely blind ended recesses entering from a side only.

From the foregoing description, taken in connection with the accompanying drawings, it is thought the complete construction and advantages of my invention will be clear to those skilled in the art to which it appertains.

What I claim is:

1. The method of manufacturing pneumatic tires which consists in building the carcass proper in the usual way, placing a slab or band of tread rubber around the periphery of the carcass, placing recess forming pins or cores around such slab, forcing the rubber of the slab outwardly between the pins by pressure from within the carcass and thereafter vulcanizing the mass while confining it to a predetermined external contour and limits.

2. The method of manufacturing pneumatic tires having transversely recessed tread portions which consists in forming a hollow carcass and an annular tread member, assembling the carcass and the tread member, said tread member including a quantity of green rubber, placing a plurality of transverse cores in engagement with the periphery of the green rubber and forcing the green rubber radially outward between the core pins while restraining the mass to a predetermined cross sectional shape and within predetermined limits, thereafter vulcanizing the mass together into an integral structure.

3. The process of forming pneumatic tires having transversely apertured tread portions which consists in forming a hollow carcass and an annular tread member, assembling said carcass and tread member with an annular strip of green rubber between them and with a plurality of transverse cores in engagement with the periphery of the green rubber strip, relatively moving said carcass and tread member radially to crowd the green rubber strip around the cores, vulcanizing the tread member, the green rubber strip and carcass together into an integral structure and thereafter removing the cores.

4. The method of manufacturing pneumatic tires having transverse apertured tread portions which consists in forming a hollow carcass and an annular tread member, assembling said carcass and tread member, said tread member including an annular strip of green rubber, placing a plurality of transverse cores in engagement with the green rubber strip, restricting outward radial expansion of the tread member and restricting expansion of the carcass except in an outward radial direction by means of a mold, inflating the carcass radially to expand it to the extent allowed by the tread member, thereby crowding the green rubber strip around the cores, vulcanizing the mass and removing the cores, thereby leaving the completed tire.

5. The method of manufacturing pneumatic tires of the ventilated tread type which consists in building a carcass proper in the usual manner, placing a band or strip of tread rubber around the periphery of the carcass and constricting the same, placing a series of core pins around the periphery of the foregoing mass, holding the core pins against movement radially of the tire, confining the mass in a chamber of definite volume, inflating the carcass to expand it radially and thereby forcing the rubber radially outward between the pins, and thereafter vulcanizing the mass into an integral structure and removing the pins and confining means.

6. The process of forming pneumatic tires having transversely apertured tread portions which consists in forming a hollow carcass and an annular tread member, assembling said carcass and tread member with green rubber and a plurality of transverse cores between them, relatively moving said carcass and tread member radially to crowd the green rubber around the cores, vulcanizing the tread member, the green rubber and carcass together into an integral structure, and thereafter removing the cores.

FREDERICK AUGUSTUS KRUSEMARK.